INVENTOR.
ELVIS D. WALLACE
ATTORNEYS

United States Patent Office 3,492,862
Patented Feb. 3, 1970

3,492,862
APPARATUS FOR TENSILE TESTING
Elvis D. Wallace, Huntsville, Ala., assignor to the United States of America as represented by the Administrator of the National Aeronautics and Space Administration
Filed June 21, 1967, Ser. No. 649,075
Int. Cl. G01n 3/28
U.S. Cl. 73—97                                   1 Claim

ABSTRACT OF THE DISCLOSURE

An apparatus for determining the tensile strength of a specimen which has been machined into the form of a piston. Pressurized fluid of which devices constructed from material forming the specimen would be subjected to in use is inserted within a cylinder of a load cell between two enlarged ends of the test specimen. By increasing the pressure until the specimen fails the tensile strength of the specimen can be calculated.

---

Figure 1:
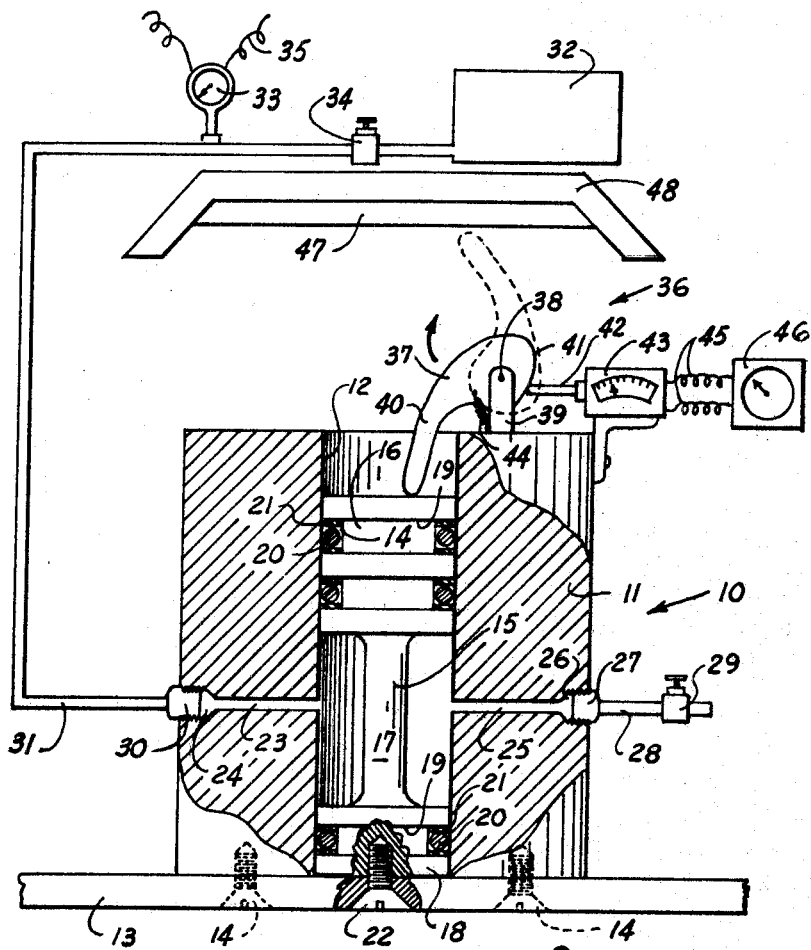

The invention described herein was made by an employee of the United States Government, and may be manufactured and used by or for the Government for governmental purposes without the payment of any royalties thereon or therefor.

This invention relates to a tensile strength tester, and more particularly to an apparatus for determining the tensile strength of a specimen in a predetermined environment.

The need has arisen particularly, in the missile field for testing the tensile strength of materials used in the construction of both space vehicles and, ground support equipment, and the like, under particular environmental conditions to which the space vehicle or its ground support equipment may be exposed. Certain components of the space vehicle are exposed to reactive fluids, such as acids and the like, and are also under pressure and exposed to various temperatures. In testing the material which is used in constructing such components, it is desired to know the cumulative effect as well as the singular effects of pressure, temperature and reactive agents on the material. Many tensile devices are on the market; however, they are generally expensive and relatively complicated and not suitable for testing the tensile strength of specimens while exposed to particular environmental conditions. Normally, they use an external source of power for pulling or tearing a test specimen asunder in order to determine the tensile strength of such, and the exposure of the specimen to environments in these testers is extremely difficult, expensive and frequently relatively unsafe. The design of these testers also is such that their use is generally confined to fixed laboratory facilities.

It is desired to provide a simple and efficient apparatus for testing the tensile strength of certain specimens under particular environmental conditions.

In accordance with the present invention, it has been found that the foregoing difficulties encountered in apparatus for testing the tensile strength of specimens may be overcome by providing a novel apparatus for determining the tensile strength of the specimen in a predetermined environment. This apparatus includes the following basic parts: (1) a load cell including a cylinder having a top and a bottom defining a piston chamber, (2) a base plate rigidly fixed to the load cell closing the bottom of the cylinder, (3) a test specimen in the form of a piston having an enlarged top portion and an enlarged bottom portion being joined by an elongated reduced test portion of predetermined diameter carried in the cylinder, (4) seals carried between the enlarged top portion of the specimen and the cylinder, (5) means anchoring the bottom portion of the specimen to the base plate, (6) an inlet passageway extending through the load cell communicating with the cylinder between the top and bottom portions of the specimen adjacent the reduced test portion, (7) a high pressure line having one end coupled to the inlet passageway, (8) a source of preselected pressurized fluid of which devices constructed from materials forming said specimen would be subjected to in use coupled to the other end of the high pressure line. The pressurized fluid bears against the reduced portion of the specimen for determining the effect the fluid has on the specimen during extended periods of time under pressure. When the pressure of the fluid is raised causing the reduced portion of the specimen to fail the top portion of the specimen is ejected out the top of the cylinder.

Accordingly, it is an important object of the present invention to provide an apparatus for determining the tensile strength of a specimen in a predetermined environment.

Another important object of the present invention is to provide a simple, inexpensive apparatus for testing the tensile strength of specimens.

Still another important object of the present invention is to provide an apparatus for testing the tensile strength of specimens which can be placed in remote areas or test chambers away from personnel and equipment.

Still another important object of the present invention is to provide an apparatus in which the specimen can be exposed to predetermined pressures and reactive agents for extended periods of time in order to determine the effect such has thereon.

A further important object of the present invention is to provide a tensile strength testing apparatus which receives a specimen in the form of a piston having a pair of opposed enlarged ends joined by a reduced portion which does not require complicated holding devices.

Figure 2:
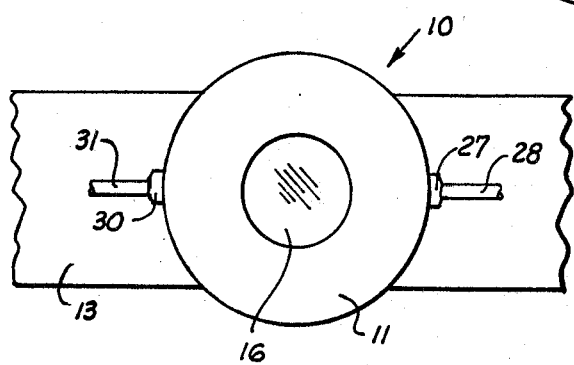

Other objects and advantages of this invention will become more apparent from a reading of the following detailed description and appended claims taken in conjunction with the accompanying drawing wherein:

FIGURE 1 is an elevational view, partially in section, illustrating an apparatus for determining the tensile strength of a specimen, and FIGURE 2 is a plan view with parts removed, illustrating the load cell of FIGURE 1.

Referring in more detail to the drawing wherein like reference numerals designate identical or corresponding parts throughout the views, and with special attention to FIGURE 1, reference numeral 10 generally designates a load cell which is utilized to test the tensile strength of a specimen. The load cell 10 is cylindrical in shape, and has a wall 11 constructed in any suitable material such as steel. A vertical cylinder 12 is disposed along a vertical axis of the load cell and has an open top and a bottom defining a piston chamber. A flat horizontal base plate 13 is rigidly fixed to the load cell 10 by any suitable means, such as screws 14, closing the bottom of the cylinder 12. The base plate 13 may be constructed of any suitable material such as steel.

A specimen of material, which is to be tensile tested, is machined into a piston, generally designated at 15. The piston has an enlarged top portion 16 and an elongated reduced test portion 17 of predetermined diameter integral therewith. The piston 15 has an enlarged bottom portion 18 integral with the lower end of the reduced portion 17. Vertically spaced circumferential grooves 19 are carried within the enlarged top portions 16 and the enlarged bottom portion 18 of the piston 15 for receiving butyl O-rings 20 and Teflon back-up rings 21. Any suitable sealing means could be utilized. A screw 22 extends through the base plate 13 and engages the enlarged bottom portion 18 of the piston 15 for anchoring such within the cylinder. An inlet passageway having a reduced portion 23 and an enlarged threaded portion 24 integral therewith, extends through the wall 11 of the load cell 10 and communicates with the interior of the cylinder 12. The reduced portion 23 of the inlet passageway is positioned within the wall 11 of the load cell between the top and bottom portions 16 and 18, respectively, of the piston 15. An outlet passageway having a reduced portion 25 and a threaded enlarged portion 26 extends through the wall 11 of the load cell communicating with the cylinder. A pressurized fitting 27 carried on the end of a high pressure line 28 is screwed within the enlarged threaded portion 27. A suitable valve 29 is interposed in the high pressure line 28 for selectively permitting passage of fluid therethrough. A high pressure fitting 30 carried on the end of a high pressure line 31 is screwed into the enlarged threaded portion 24 of the inlet passageway. The other end of the high pressure inlet line 31 is connected to a pressurized source of fluid 32. Such pressurized source 32 may be any suitable device for supplying fluid through the input line 31 into the load cell under a controlled pressure. A pressure meter 33 and a valve 34 are interposed in the input line 31 for measuring the pressure of the fluid passing therethrough and for closing the line, respectively, in order to hold the pressure in the line at a desired pressure level. Leads 35 are connected to the pressure meter 33 so that readings of such can be taken at a remote area.

Normally, the fluid supplied by the pressurized source 32 is the same fluid (liquids or gases) in which devices constructed from material forming the test specimen would be subjected to in use. Such is to determine the effect on the material by the fluid when under pressure. Typical fluid or media are liquid fluorine, various cryogenic liquids, unsymmetrical dimethyl hydrazine, and other chemicals, gases or compounds.

A strain measuring device, generally designated at 36, engages an upper surface of the piston 15 for measuring the longitudinal strain of the reduced test portion 17 when the specimen is under pressure. Any suitable strain measuring device could be utilized in conjunction with the testing apparatus. The strain measuring device incorporates a camming lever 37 which is pivotally mounted on a pin 38 carried between a pair of posts 39. The camming lever has an outwardly extending arm 40 which rests on top of the specimen, and as the specimen is expanded due to strain the arm is raised accordingly. An eccentric surface 41 is carried adjacent the other end of the camming lever so that as the lever is raised during the test the eccentric surface 41 forces a plunger 42 associated with a meter 43 to the right. A spring 44 is connected between the arm 40 of the camming lever 37 and the posts 39 for maintaining the arm in contact with the top of the piston 15.

The meter 43 may be any suitable meter calibrated to measure the vertical displacement of the piston 15 responsive to lateral displacement of the plunger 42. Leads 45 are connected to the meter 43 for providing a reading on a remotely located meter 46. Any suitable meter could be used for the meter 46.

When the pressure within the cylinder is built up to the point where the reduced portion 17 of the specimen tears apart, the enlarged top portion 16 is ejected from the cylinder 12 and impinges upon a buffer plate or pad 47 retained by any suitable holder 48. The purpose of the buffer pad 47 and the holder 48 is to prevent the ejected portion of the specimen from incurring or causing damage.

In operation a specimen of material is machined into a piston 15 having opposed enlarged ends, such as illustrated at 16 and 18. The ends of the piston are provided with sealing means, such as illustrated at 20 and 21. It is to be noted however, that the reduced portion 17 can be made separate from the enlarged ends 16 and 18, and the ends threaded so that such can be screwed into threaded holes provided in the enlarged ends. In such a construction the enlarged ends can be reused. The piston is inserted within the cylinder 12 and anchored to the bottom by the screw 22. The test media or fluid which would normally be exposed to components or parts constructed from the material from which the specimen was selected is supplied to the pressurized source 32. The valves 34 and 29 are open allowing the fluid to flow through the high pressure line 31 into the cylinder, and out the high pressure line 28. The output valve 29 is then closed and the pressure is raised to a predetermined level and held at that level for a selected period of time. From such a test the effect of the fluid on the specimen can be determined. During the holding test the strain measuring device 36 will monitor the effect of the fluid and pressure on the test specimen and any movement of the piston head 16 will be recorded by the strain measuring device 36. It is noted that the force being applied by the fluid is exerted on the top and bottom portions 16 and 18, respectively, of the piston 15 tending to separate such. This action causes a strain on the reduced portion 17.

After the holding period the pressure in line 31 is increased until the reduced test portion 17 of the specimen fails causing the top portion 16 of the piston to be ejected out of the cylinder 12 to strike the buffer plate 47. Calculations can be made by utilizing the pressure recorded on meter 33 and the exposed area of the piston head 16 and the diameter of the reduced test portion 17 to determine the exact pounds per square inch which was required to sever the test portion 17.

The load cell 10 can be constructed to receive heating or cooling elements by any suitable means (not shown) so that the test specimen is exposed to pressure, a reactive agent, and temperature to determine the reaction on such in any particular environment.

When the top portion of the piston is ejected from the cylinder the camming lever 37 pivots out of the path of such to the dotted line position. During the holding period the strain encountered in the test specimen causes the piston to move vertically. This movement causes the camming lever 37 to pivot upwardly and forces the plunger 42 to the right. The meter 43 records the movement of the plunger in inches or the like.

One particular advantage of the testing apparatus illustrated is that it can be positioned in remote areas and no complicated holding means is required for holding the specimen during test.

While a preferred embodiment of the invention has been described using specific terms, such description is for illustrative purposes only, and it is to be understood that changes and variations may be made without departing from the spirit or scope of the following claims.

What is claimed is:

1. An apparatus for determining the tensile strength of a specimen in a predetermined environment comprising:
 (A) a load cell including a cylinder having a top and bottom defining a piston chamber;
 (B) a base plate rigidly fixed to said load cell enclosing the bottom of said cylinder;
 (C) a test specimen in the form of a piston having an enlarged top portion and an elongated reduced test portion of a predetermined diameter integral with said enlarged top portion;
 (D) said test specimen being carried within said piston chamber;
 (E) a seal fitted between said enlarged top portion of said test specimen and said cylinder;
 (F) means for anchoring the bottom of said test specimen to said base plate;
 (G) an inlet passageway extending through said load cell communicating with said piston chamber below said enlarged top portion and adjacent to said elongated reduced test portion of said test specimen;
(H) a high pressure line having one end coupled to said inlet passageway;
(I) a source of preselected pressurized fluid coupled to the other end of said high pressure line;
(J) valve means connected to said high pressure line for regulating the pressure of said preselected pressurized fluid in said piston chamber;
(K) a camming lever pivotally mounted on the top of said load cell adjacent to said cylinder;
(L) one portion of said camming lever having an arm extending into said cylinder and contacting said enlarged top portion of said test specimen;
(M) another portion of said camming lever having an eccentric surface for operating a strain measuring device mounted on said load cell;
(N) a spring connected between said camming lever and said load cell for normally maintaining said arm in contact with said enlarged top portion of said test specimen; and
(O) said camming lever positioned on said load cell so that said arm normally contacts said enlarged top portion of said test specimen but pivots clear of said cylinder when said pressure is raised by said valve means thereby causing said elongated reduced test portion of said test specimen to fail and said enlarged top portion of said test specimen to be ejected out of the top of said cylinder.

References Cited

FOREIGN PATENTS 552,993  5/1943  Great Britain.

CHARLES A. RUEHL, Primary Examiner

J. R. FLANAGAN, Assistant Examiner